April 16, 1946.　　J. W. MORRISON　　2,398,754
LIGHTING EQUIPMENT
Filed Sept. 27, 1944　　2 Sheets-Sheet 1

INVENTOR.
John W. Morrison
BY
Zugelter & Zugelter
Atty's.

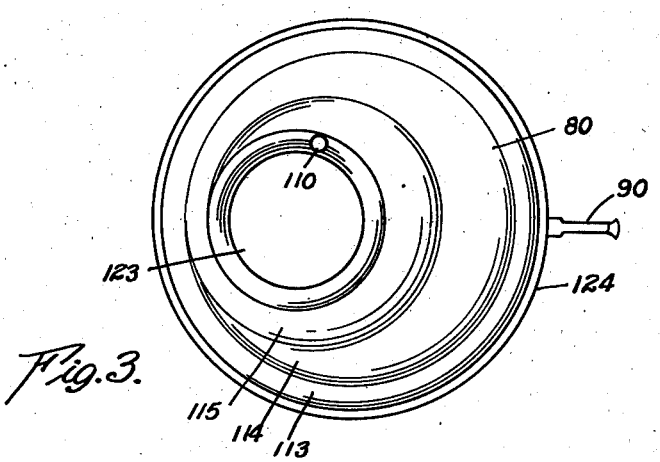
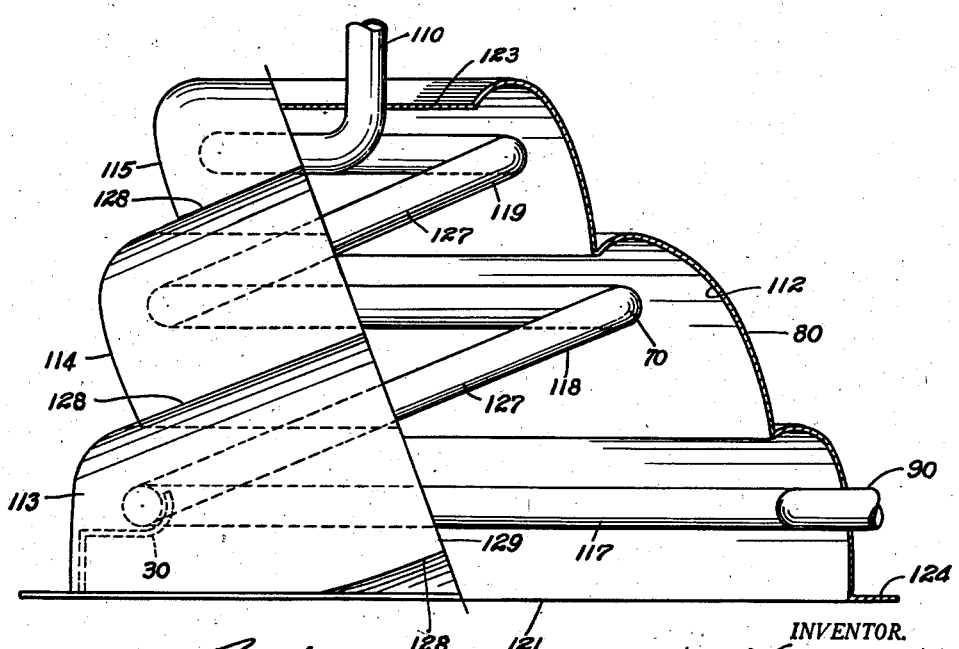

Patented Apr. 16, 1946

2,398,754

UNITED STATES PATENT OFFICE 2,398,754

LIGHTING EQUIPMENT

John W. Morrison, Cincinnati, Ohio

Application September 27, 1944, Serial No. 556,002

4 Claims. (Cl. 240—1)

This invention relates to improvements in lighting equipment, and is directed particularly to improving the lighting effects obtainable from fluorescent or like gaseous discharge light sources.

An object of the invention is to provide an improved arrangement of gaseous discharge lighting tube and reflector therefor, which overcomes certain recognized objections to the use of the indicated type of lighting for merchandise display purposes and the like.

Another object is to provide a novel and effective lighting fixture incorporating a gaseous discharge light source of substantially spiro-helical formation, in combination with a corespondingly shaped reflector having reflecting areas in focal relationship to the light source along its length.

The foregoing and other objects are attained by the means described herein and illustrated in the accompanying drawings, in which:

Fig. 3 is a top plan view of a modified form of fixture, characterized by an oblique disposition of parts.

Fig. 4 is an enlarged side elevational view of the modified fixture, shown partly in vertical cross-section.

As was stated in the introductory portion of this specification, one of the objects of the present invention is to provide a lighting fixture designed to improve the lighting effects obtainable from fluorescent or like gaseous discharge light sources. Such light sources are electrically energized and comprise long tubes constructed of glass or a glass-like substance. With the use of means well known and in common usage, an electric potential is impressed upon the tube for causing it to glow and emit light rays, which rays emanate from the tube in all directions substantially at right angles to the axis of the tube.

The fact that the light rays emanate from the tube at right angles to the tube axis, has presented some difficult problems in an effort to obtain proper lighting control under certain circumstances of usage. Persons concerned in the problems indicated recognize as one of the chief objections to this form of illumination, the production of a so-called flat lighting effect not particularly conducive to effective use where third dimensional characteristics are desired in the illumination. Efforts to cure the objectionable characteristics of the light obtainable from the gaseous discharge tube, have been confined to corrective schemes or practices, for example, that of mixing sources of light having various color and intensity characteristics, but it has been conceded that the faults inherent in gaseous discharge tube lighting have not been satisfactorily solved heretofore.

Although most of the difficulties above briefly outlined have occurred in connection with show window lighting, lighting for merchandise display purposes and the like, the improvements concerning the present invention, while solving the problems arising under the indicated circumstances, are not to be so limited in their application. For instance, similar third dimensional characteristics in illumination are often required for industrial or kindred application. The device of the present invention improves the character of gaseous discharge lighting under practically all circumstances and conditions in which gaseous discharge tube lighting might be specified or installed.

In describing the invention, it will not be necessary to explain the intricacies of any mechanism or equipment for supplying the proper potential and other characteristics of electric energy needed to energize the gaseous discharge lighting tube. Such accessories are well known and are presently in common usage wherever gaseous discharge tube lighting is used.

Figure 1:
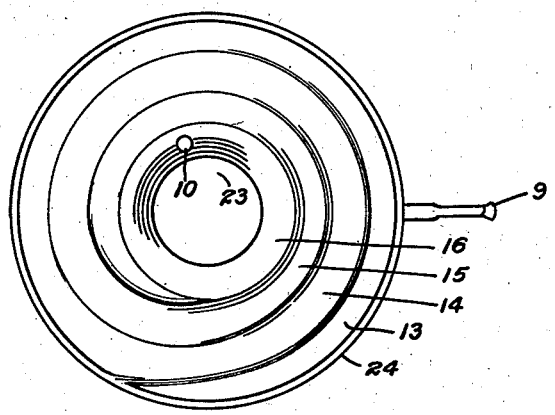
Fig. 1 is a top plan view of an improved lighting fixture, characterized by a regularity of form.
Figure 2:
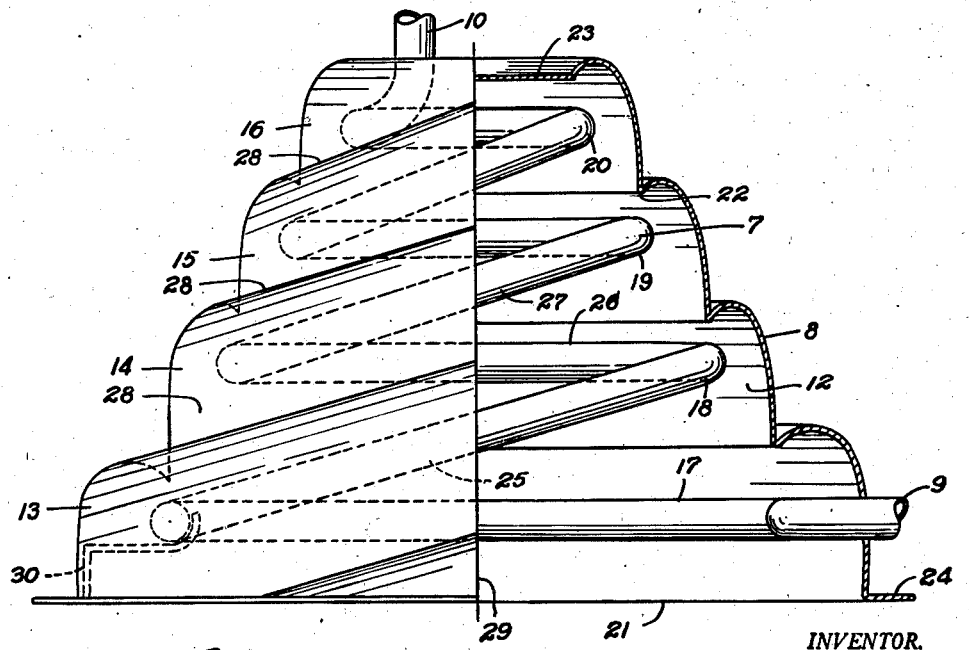
Fig. 2 is an enlarged side elevational view of the same, half being shown in vertical section.

The present invention relates more particularly to a fixture for the control of light produced by the gaseous discharge tube. Referring to Figs. 1 and 2, it is noted that the fixture comprises generally the gaseous discharge tube or source of light indicated at 7, and a reflector surrounding the light source, indicated generally by the character 8.

The lighting source comprises a tubular envelope, of glass or glass-like material, bent or shaped to a spiro-helical form. The term "spiro-helical form" is intended to convey the impression of a glass-like tube of substantial length wound to a generally spiral formation, not in a single plane, but rather as a helix, with the convolutions of the spiral becoming progressively smaller in the direction of the upper end of the tube or envelope. The outline of the spiro-helical light tube accordingly simulates a truncated cone.

The terminal ends 9 and 10 of the tubular lighting element are properly shaped for reception by suitable sockets or receptacles which carry the necessary electrical charge to energize the tube and cause it to emit light rays as previously explained. The particular shape or configuration of the terminal ends of the tube, is a matter with which the present invention is not concerned.

The reflector 8, which encloses the light tube 7 except where the electrical connections are made to the terminal ends of the tube, may be formed of any suitable material presenting an interior surface 12 which may be mirrored, polished, coated, or otherwise treated to render it effectively reflective of light rays from the tube. The reflective surface 12 of the reflector, and preferably the reflector as a whole, is formed or shaped to spiro-helical formation correspondingly with the tube 7. That is, the convolutions indicated at 13, 14, 15 and 16 of the reflector, are pitched and spaced correspondingly with the convolutions 17, 18, 19 and 20 of the light tube 7, so that light rays emanating from points on the tube adjacent to the reflective areas of the reflector will be concentrated and directed downwardly through the open bottom 21 of the reflector.

As will be evident from the illustration of Fig. 2, the reflector convolutions and all points on the reflective areas facing the light source or tube 7, are disposed in focal relationship to the light source or tube; and due to the fact that the gaseous discharge tube is presumed to emit its light rays from the surface thereof, rather than from a point or line within, the reflective areas or surfaces of the reflector are designed on the application of curvatures including the involute of a circle, or specific circle areas, or parabolic segments, or such combinations of these as may be necessary to focus or distribute the rays over any given area or objective beneath the open bottom of the reflector. The proper curvatures may be calculated or determined applying the ordinary principles of reflector design, taking into account the continuity of the light source and reflecting area convolutions from top to bottom of the fixture.

It may be noted that in locating the light source tube relative to the reflector convolutions, the tube is positioned as nearly as possible directly beneath the bases 22 of the convolutions, so that the tube may not seriously interfere with the desired projection of the reflected rays. It should be understood that the entire inner surface of the reflector is light reflective, by preference. The top of the reflector may be closed as at 23, and the lower open end may be furnished with a peripheral reinforcing flange or extension 24. This flange or extension may be flat as shown, or otherwise shaped to provide the desired reinforcement or to provide a means of mounting the reflector upon a support. Means other than the flange might be employed for mounting the reflector if desired, depending upon conditions to be met incident to effecting installation.

Although the spiro-helical configuration of the tube and reflector may be fashioned with greater adherence to regularity of the helical lead than shown, it has been determined, for the present at least, that certain efficiencies and manufacturing advantages may be gained by slightly departing from the regularity of the helical formation. By referring to Fig. 2, it may be noted that the lowermost convolution of the tube 17 rests in a horizontal plane throughout approximately half the extent of the convolution, and then advances upwardly to the next convolution on an incline as indicated at 25, the incline portion constituting approximately the remaining half of the whole convolution. The tube then continues horizontally as at 26 throughout approximately a half convolution, and then inclines upwardly to the next convolution as at 27, this being repeated until the last convolution at 20 is reached. The convolutions 13, 14, 15 and 16 of the reflector are similarly and correspondingly formed, parts being horizontal as indicated at the right of Fig. 2, and other parts being inclined as at 28 at the left of Fig. 2. The mean axis of all the convolutions, i. e., those of the tube and the reflector, coincide substantially with the section line 29 which meets the plane of the flange 24 at right angles.

It is here pointed out that the terminal end 10 of the lighting tube may in some instances extend from the side of the reflector, as does the end 9, rather than through the stop.

The modified structure of Figs. 3 and 4 is one that may be extensively used in show window lighting installations, as it is designed to direct the light rays downwardly at an angle. In this embodiment, the lighting tube 70 and the reflector element 80 are of substantial spiro-helical formation as previously explained, but the convolutions thereof are displaced to one side of a vertical line passing through the center of the bottom opening 121. The axis of the reflector convolutions 113, 114, and 115, and the axis of the tube convolutions 117, 118, and 119 are coincident and rest in parallelism with the oblique section line 129. This results in casting the reflected rays from tube 70 downwardly in substantially the direction of the oblique line 129.

The inner surface 112 of the reflector 80 is rendered reflective as explained in connection with Figs. 1 and 2, and is continuous from top to bottom due to its spiro-helical form. Like the structure of Figs. 1 and 2, the structure of Figs. 3 and 4 displays correspondency in the horizontal and inclined sections of the tube and of the reflector. The inclined sections or areas of the reflector are indicated by the characters 128, whereas those of the tube are indicated at 127. The top of the reflector may be closed as at 123, and the terminal end 110 of the lighting tube may extend therethrough in the upright position illustrated, or in a transverse position at which the end 110 passes laterally through the reflector, for the reason previously stated.

The lower terminal end of the gaseous discharge lighting tube is indicated at 90, and 124 indicates a suitable reinforcing or mounting flange for the lower open end of the reflector. The nature of this flange may be varied, depending upon the peculiarities of installation conditions. In some installations, the mounting of the fixture may be effected otherwise than by means of the peripheral flange. Clips or supports such as 30 may be attached to the interior of the reflector for supporting the tube wherever support may be required.

In conclusion it is pointed out that fixtures constructed in accordance with the invention may be inexpensively manufactured and assembled, as they comprise a minimum number of parts designed for rapid production. Their use eliminates the need for light-corrective accessories and scientific supervision attending installations.

It is to be understood that various modifications and changes in structural details may be made in the fixture, within the scope of the appended claims, without departing from the spirit of the invention.

What is claimed is:

1. A lighting fixture constructed to overcome the flat lighting effect on gaseous tube illumination, comprising in combination, a cup-shaped reflector of generally spiro-helical form, said reflector having reflective inner surfaces, and an enlarged annular lower open end the edge of which rests in a plane, the several convolutions of the reflector each having a portion of its length disposed in a plane which is parallel to the plane of the lower edge of the reflector, and each having an inclined portion joining an end of the planar portion of one convolution to an end of the planar portion of the next adjacent convolution, thereby to establish continuity of the reflective surfaces of the reflector, the reflective surfaces being formed by combining circular arcs and involutions of a circle, a continuous base edge following the reflector convolutions and directed toward the lower open end of the reflector, said base edge increasing correspondingly in reach with the increase in size of the reflector convolutions in the direction of the open end, and a gaseous discharge lighting tube of generally spiro-helical form supported in spaced relationship to the reflective surfaces, with every point of its axis located substantially on a line which parallels the axis of the reflector and passes through the continuous base edge of the reflector convolutions.

2. A lighting fixture constructed to overcome the flat lighting effect of gaseous tube illumination, comprising in combination, a cup-shaped reflector of generally spiro-helical form, said reflector having reflective inner surfaces, and an enlarged annular lower open end the edge of which rests in a plane, the several convolutions of the reflector each having a portion of its length disposed in a plane which is parallel to the plane of the lower edge of the reflector, and each having an inclined portion joining an end of the planar portion of one convolution to an end of the planar portion of the next adjacent convolution, thereby to establish continuity of the reflective surfaces of the reflector, the reflective surfaces being formed by combining circular arcs and involutions of a circle, a continuous base edge following the reflector convolutions and directed toward the lower open end of the reflector, said base edge increasing correspondingly in reach with the increase in size of the reflector convolutions in the direction of the open end, and a gaseous discharge lighting tube of generally spiro-helical form supported in spaced relationship to the reflective surfaces, with every point of its axis located substantially on a line which parallels the axis of the reflector and passes through the continuous base edge of the reflector convolutions, the convolutions of the lighting tube being successively offset relative to one another for precluding casting of a projected shadow by one convolution emitting light rays onto a subjacent convolution of the tube.

3. A lighting fixture constructed to overcome the flat lighting effect of gaseous tube illumination, comprising in combination, a cup-shaped reflector of generally spiro-helical form, said reflector including an enlarged annular lower edge resting in a plane, and a series of convolutions providing reflective inner surfaces, the convolutions being described generally about an axis oblique to the planar lower edge of the reflector, and each having a portion of its length disposed in a plane which is substantially parallel to said lower edge, said convolutions each having an inclined portion joining an end of the planar portion of the next adjacent convolution, thereby to establish continuity of the reflective surfaces of the reflector, the reflective surfaces being formed by combining circular arcs and involutions of a circle, a continuous base edge following the reflector convolutions and directed toward the lower open end of the reflector in the general direction of its oblique axis, said base edge increasing correspondingly in reach with the increase in size of the reflector convolutions in the direction of the open end, and a gaseous discharge lighting tube of generally spiro-helical form supported in spaced relationship to the reflective surfaces, with every point of its axis located substantially on an oblique line which parallels the axis of the reflector and passes through the continuous base edge of the reflector convolutions.

4. A lighting fixture constructed to overcome the flat lighting effect of gaseous tube illumination, comprising in combination, a cup-shaped reflector of generally spiro-helical form, said reflector including an enlarged annular lower edge resting in a plane, and a series of convolutions providing reflective inner surfaces, the convolutions being described generally about an axis oblique to the planar lower edge of the reflector, and each having a portion of its length disposed in a plane which is substantially parallel to said lower edge, said convolutions each having an inclined portion joining an end of the planar portion of the next adjacent convolution, thereby to establish continuity of the reflective surfaces of the reflector, the reflective surfaces being formed by combining circular arcs and involutions of a circle, a continuous base edge following the reflector convolutions and directed toward the lower open end of the reflector in the general direction of its oblique axis, said base edge increasing correspondingly in reach with the increase in size of the reflector convolutions in the direction of the open end, and a gaseous discharge lighting tube of generally spiro-helical form supported in spaced relationship to the reflective surfaces, with every point of its axis located substantially on an oblique line which parallels the axis of the reflector and passes through the continuous base edge of the reflector convolutions, the convolutions of the lighting tube being successively offset relative to one another for precluding casting of a projected shadow by one convolution emitting light rays onto a subjacent convolution of the tube.

JOHN W. MORRISON.